United States Patent
Rodriguez et al.

(10) Patent No.: US 6,487,718 B1
(45) Date of Patent: Nov. 26, 2002

(54) METHOD AND APPARATUS FOR INSTALLING APPLICATIONS IN A DISTRIBUTED DATA PROCESSING SYSTEM

(75) Inventors: Herman Rodriguez, Austin, TX (US); Joel Leslie Smith, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/282,637

(22) Filed: Mar. 31, 1999

(51) Int. Cl.[7] ............................................. G06F 9/445
(52) U.S. Cl. ..................... 717/177; 717/178; 717/174; 717/175; 717/168; 709/203; 709/232
(58) Field of Search .................. 717/11, 174, 175–177, 717/176, 178, 168, 169, 170, 171, 172, 100, 101; 707/201, 10, 200; 709/203, 232, 200, 201

(56) References Cited

U.S. PATENT DOCUMENTS

| | | | | |
|---|---|---|---|---|
| 5,594,903 A | * | 1/1997 | Bunnell et al. ................ 717/11 |
| 5,715,464 A | | 2/1998 | Crump et al. ................ 395/750 |
| 5,758,165 A | * | 5/1998 | Shuff ........................... 717/11 |
| 5,758,355 A | * | 5/1998 | Buchanan .................... 707/201 |
| 5,764,235 A | | 6/1998 | Hunt et al. ................... 345/428 |
| 5,799,147 A | * | 8/1998 | Shannon ........................ 714/6 |
| 5,822,582 A | | 10/1998 | Doragh et al. ............... 395/652 |
| 5,822,600 A | | 10/1998 | Hallowell et al. ..... 395/750.05 |
| 5,842,011 A | * | 11/1998 | Basu ............................. 713/2 |
| 6,058,428 A | * | 5/2000 | Wang et al. ................ 709/232 |
| 6,070,012 A | * | 5/2000 | Eitner et al. ................ 717/168 |
| 6,173,417 B1 | * | 1/2001 | Merrill ........................ 714/15 |
| 6,209,031 B1 | * | 3/2001 | Casey et al. ................ 709/222 |
| 6,226,667 B1 | * | 5/2001 | Matthews et al. .......... 709/203 |
| 6,249,787 B1 | * | 6/2001 | Schleimer et al. ............ 707/10 |
| 6,266,809 B1 | * | 7/2001 | Craig et al. .................... 717/11 |
| 6,324,690 B1 | * | 11/2001 | Luu ............................. 717/177 |
| 6,343,280 B2 | * | 1/2002 | Clark .......................... 705/55 |
| 6,389,592 B1 | * | 5/2002 | Ayres et al. ................ 717/172 |
| 6,396,941 B1 | * | 5/2002 | Bacus et al. ................ 382/128 |

OTHER PUBLICATIONS

Title: Removing Product Images from a Code Server and Creating Bootable Diskettes to Remotely Install Selected Products, Dec. 1993, IBM Technical Disclosure Bulletin.*
Title: Designing distributed applications with mobile code paradigms, ACM, author: Caraniga et al, May 1997.*
Title: Distributed desktop conferencing system (Mermaid) based on group communication architecture, Maeno et al, 1991, IEEE.*

* cited by examiner

*Primary Examiner*—Gregory Morse
*Assistant Examiner*—Chameli C. Das
(74) *Attorney, Agent, or Firm*—Duke W. Yee; Jeffrey S. LaBaw; Christopher P. O'Hagan (57) ABSTRACT

A method and apparatus for installing an application on a client computer. An image is created of a selected client computer. The image of the selected client computer is placed on another computer. The application is installed on the another computer, wherein an update image is created. The updated image is sent back to the client computer.

25 Claims, 5 Drawing Sheets

METHOD AND APPARATUS FOR INSTALLING APPLICATIONS IN A DISTRIBUTED DATA PROCESSING SYSTEM

CROSS REFERENCE TO RELATED APPLICATIONS

The present invention is related to application entitled Method And Apparatus For System Maintenance On An Image In A Distributed Data Processing System, Ser. No. 09/282,613, filed even date hereof, assigned to the same assignee, and incorporated herein by reference.

BACKGROUND OF THE INVENTION

1. Technical Field

The present invention relates generally to an improved distributed data processing system and in particular to an improved method and apparatus for maintaining a distributed data processing system. Still more particularly, the present invention provides a method and apparatus for installing application on computers in a distributed data processing system.

2. Description of Related Art

In the early 1980s, as the first PC's were sold, people in the Information Systems (IS) industry thought that PC's might replace mainframe computers and cut operating costs drastically. Over the years, as personal computers gained more functionality and better user interfaces, end-users improved their productivity and ability to generate data. While enterprise data and legacy applications were still placed on the more reliable mainframe platforms, there was more and more need for distributed access to application and data resources.

The IS industry succeeded in connecting the two worlds of PC's and mainframes by implementing a client/server model with distributed databases. With the evolution of multi-platform applications over a variety of networking infrastructures, it appeared that PC's might replace mainframe computers. However, as people in the IS industry realized the immense overall costs of this approach, the client/server model evolved in many directions.

The choice of a wider variety of computer platforms improves the enterprise's ability to make appropriate investments in the evolving computing marketplace. The following is a description of various computer platforms and some of their characteristics.

Non-Programmable Terminals (NPT's) are often found in large enterprises connected to host-based applications systems. With the NPT, the user interface is managed and controlled by the central processing system. Historically, these terminals were the first to bring end-user access to information in the enterprise's central databases.

Network Computers (NC's), based on RISC processors, offer greater versatility than NPT's because they have a built-in capability to run emulation software and to provide access to Java™ and Windows™-based applications, such as browsers. NC's are typically implemented with only a general purpose processor, a system memory, and a communications port. Although other types of peripheral devices may be included, local drives, such as hard disk and floppy drives, are characteristically absent from such data processing systems. While the primary reason for not providing a local drive within such data processing systems is cost-saving, other reasons may include low-power requirement and compactness. Therefore, NC's typically rely upon network access to provide dynamic, non-volatile data storage capability. Managed PC's provide an Intel-based (or compatible) hardware platform that offers one the ability to run network computing operating systems. NC's and managed PC's are very similar. The major difference is that NC's generally have sealed cases and are not up-gradeable, while managed PC's have locked covers and can be upgraded.

Traditional PC's, such as desktop and laptop PC's, are designed to offer highly sophisticated end-user environments. People who travel a lot, or who work at various locations, may use laptop PC's that require local, nonvolatile storage devices and a fully functional set of applications wherever they are, whether or not there is network connection available. The installation of workgroup computing software and complete application suites requires a powerful machine with significant local networking capabilities.

Each of the various network computing platforms has advantages and disadvantages. NPT's have the advantage of presenting a standard platform to each user. However, as users become more technically sophisticated through everyday use of various computing devices, users demand more options in their access to data and to computing resources, which may not be available through the use of NPT's. Managed PC's may have the ability to be tailored for sophisticated users, but as their name implies, managed PC's are purposely restricted in the number and variety of the software applications and hardware configurations which are presented to the user.

Traditional PC's on a network have the advantage of providing extensive flexibility. In order to accommodate their need for computing resources, users may add peripherals and software applications directly to a PC, while a network administrator may provide other resources on the network for many users in a common fashion. The disadvantages include the immense burden placed on a network or system administrator in ensuring that the various PC's retain some semblance of a standard configuration. Certain operating systems, such as Microsoft Windows NT, provide various levels of system administration capabilities for accomplishing such tasks. However, enormous costs and amounts of time may be spent in accommodating user preferences while ensuring corporate directives for the use of standard configurations.

One of the main advantages of network computing is the any-to-any type of connectivity between applications without having to worry about the hardware or software platforms in use. Network computing can be described as the use of different open technologies providing connectivity, ease-of-use, application functionality, information access, scalability, and systems management across widely dispersed types of networks. By making use of open standard technologies, network computing provides many advantages of the client/server paradigm while avoiding its numerous disadvantages. This goal could be achieved by the implementation of standards on all the platforms involved, such as TCP/IP, for the networking protocol, and 100% pure Java™ applications, in the hope that it will lead to truly portable applications, and solutions where in the network computing environment, all devices are able to easily communicate with one another.

With managed PCs in a network computing environment, the client's disk image is a remote image from a server. Installing applications at these PCs are a difficult and time consuming task. The difficulty lies partly in the fact that the user of the PC is typically not well versed in the data processing system and application dependencies. Further, most users are not well prepared to administer and support installation problems. The installation and support of applications usually entails a large degree of expertise and time. As a result, an IS or other network manager is usually in charge of installing new applications on PCs in a network computing environment. Installation of these applications require the installer to travel from PC to PC to install and insure that the application will run trouble free at the particular PC. This type of installation is time consuming, especially when in many cases PCs requiring new applications may be located on different floors, different buildings, or even in different cities.

Thus, it would be advantageous to have an improved method and apparatus for installing applications in a network computing environment.

SUMMARY OF THE INVENTION

The present invention provides a method and apparatus for installing an application on a client computer. An image is created of a selected client computer. The image of the selected client computer is placed on another computer. The application is installed on the another computer, wherein an update image is created. The updated image is sent back to the client computer.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
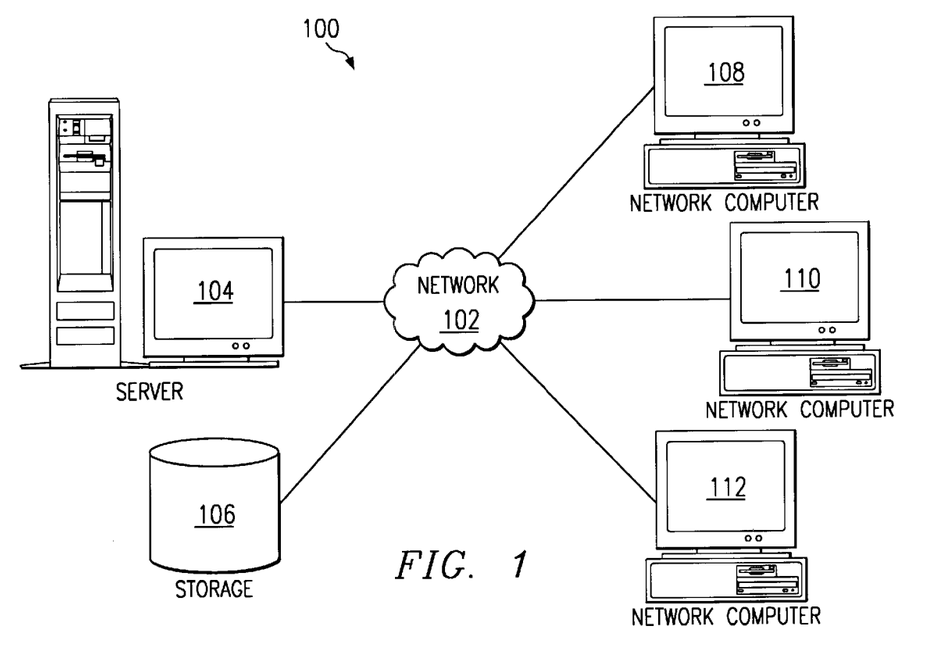
FIG. 1 depicts a pictorial representation of a distributed data processing system in which the present invention may be implemented.

With reference now to the figures, FIG. 1 depicts a pictorial representation of a distributed data processing system in which the present invention may be implemented. Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 is connected to network 102 along with storage unit 106. In addition, clients 108, 110, and 112 also are connected to a network 102. These clients 108, 110, and 112 may be, for example, personal computers or network computers. For purposes of this application, a network computer is any computer, coupled to a network, which receives a program or other application from another computer coupled to the network. In the depicted example, server 104 provides data, such as boot files, operating system images, and applications to clients 108–112. Clients 108, 110, and 112 are clients to server 104. Distributed data processing system 100 may include additional servers, clients, and other devices not shown. In the depicted example, distributed data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, distributed data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
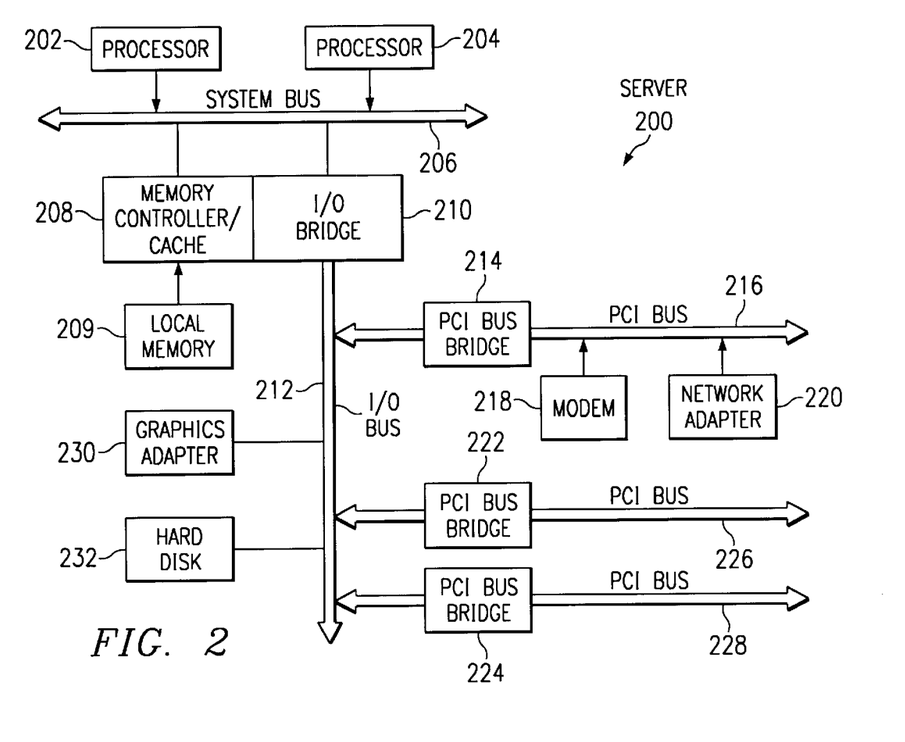
FIG. 2 is a block diagram depicting a data processing system, which may be implemented as a server, in accordance with a preferred embodiment of the present invention.

Referring to FIG. 2, a block diagram depicts a data processing system, which may be implemented as a server, such as server 104 in FIG. 1, in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
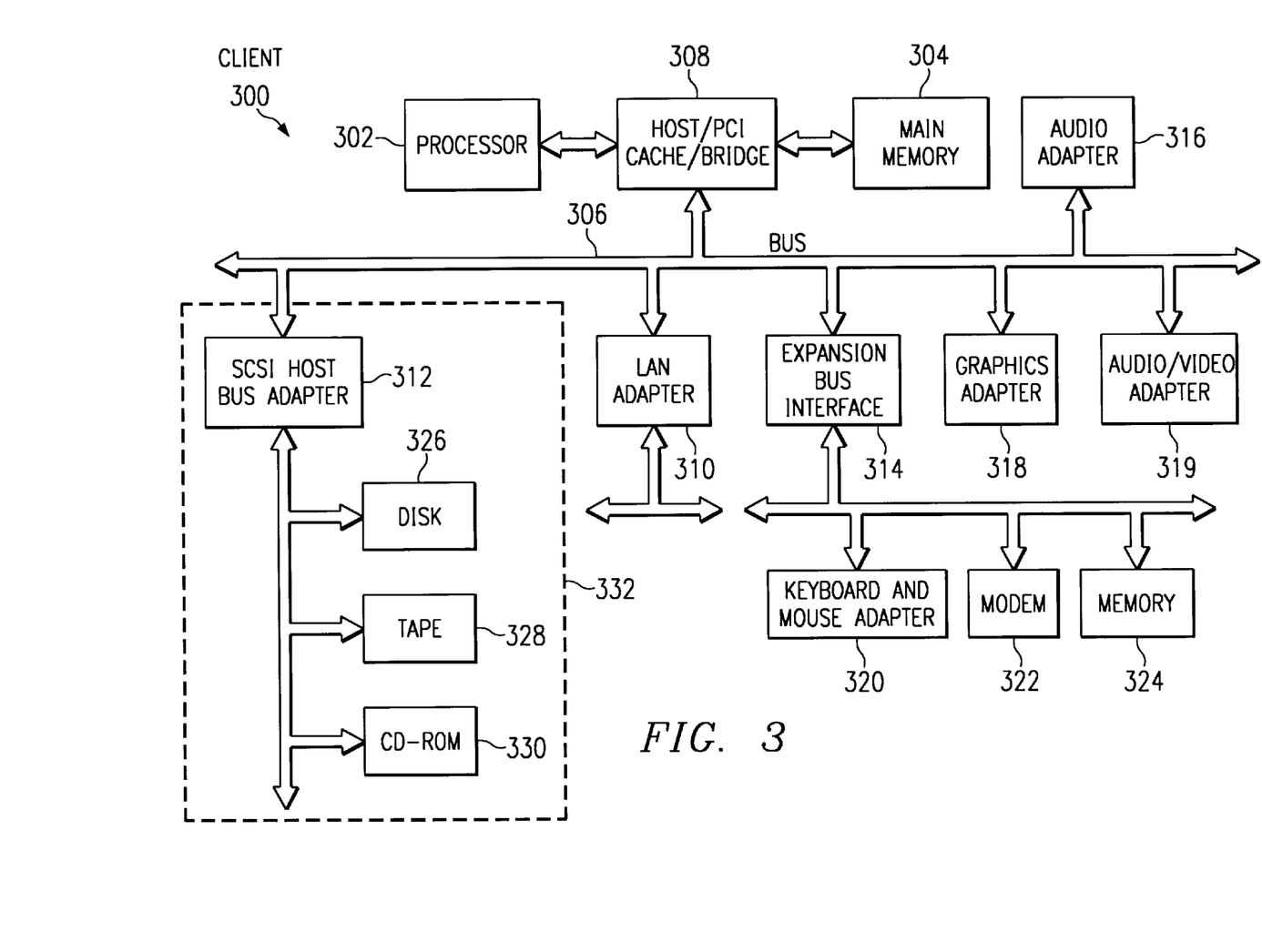
FIG. 3 is a block diagram illustrating a data processing system in which the present invention may be implemented.

With reference now to FIG. 3, a block diagram illustrates a data processing system in which the present invention may be implemented. Data processing system 300 is an example of a client computer. Data processing system 300 employs a peripheral component interconnect (PCI) local bus architecture. Although the depicted example employs a PCI bus, other bus architectures such as Micro Channel and ISA may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system such as OS/2, which is available from International Business Machines Corporation. "OS/2" is a trademark of International Business Machines Corporation. An object oriented programming system such as Java may run in conjunction with the operating system and provides calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

For example, data processing system 300, if optionally configured as a network computer, may not include SCSI host bus adapter 312, hard disk drive 326, tape drive 328, and CD-ROM 330, as noted by dotted line 332 in FIG. 3 denoting optional inclusion. In that case, the computer, to be properly called a client computer, must include some type of network communication interface, such as LAN adapter 310, modem 322, or the like. As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device which is configured with ROM and/or flash ROM in order to provide non-volatile memory for storing operating system files and/or user-generated data.

The depicted example in FIG. 3 and above-described examples are not meant to imply architectural limitations.

The present invention provides a method, apparatus, and instructions for installing an application on a computer. This installation may be performed without requiring the installer to travel from one computer to another. A copy of the client system's operating environment is made. This copy is also referred to as a snapshot image and is typically a copy of the persistent storage at the computer. The new application is then installed using the snapshot image. This may be accomplished at a computer near or convenient to the installer without requiring the installer to travel to the computer. The install application may be tested to ensure that it will execute correctly and not cause error in the execution of other programs. When the installation is complete, the image may be returned to the computer over the network.

Figures 4A, 4B:
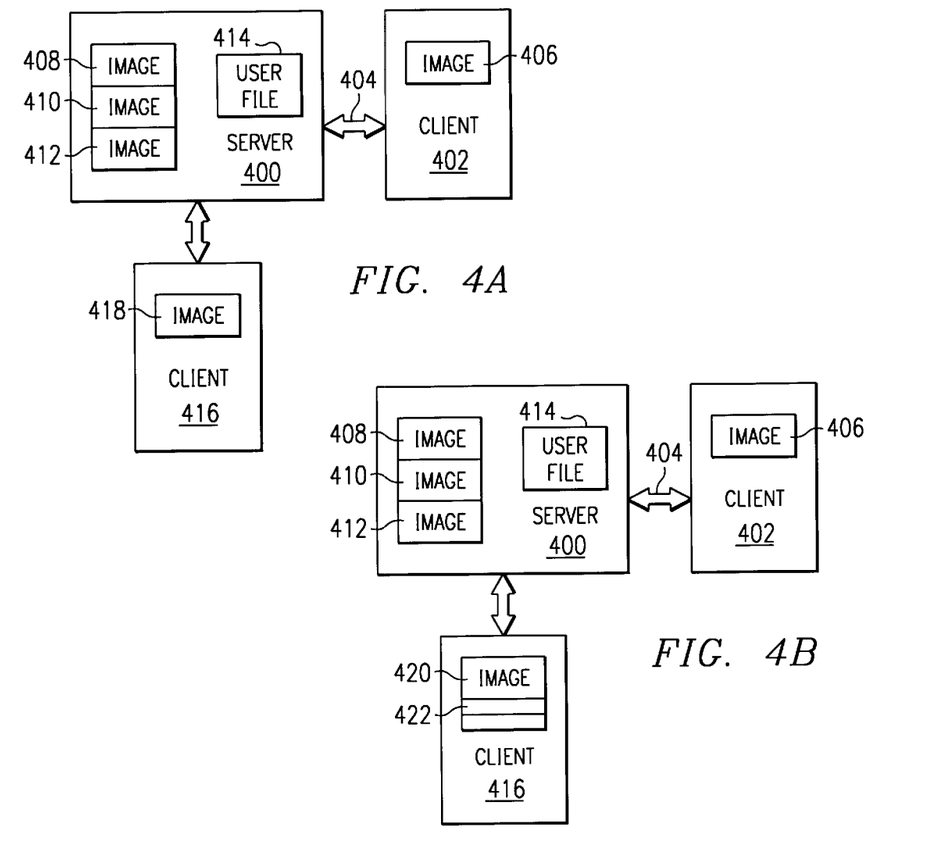
FIGS. 4A–4C are diagrams illustrating the installation of an application on a client computer depicted in accordance with a preferred embodiment of the present invention.
Figure 4C:
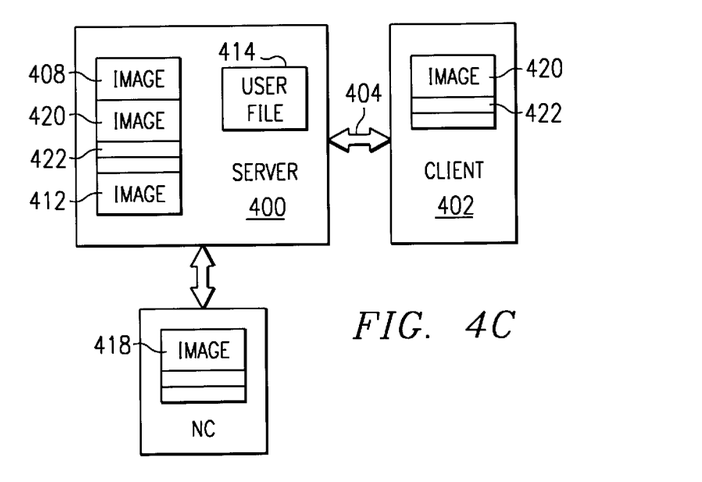

With reference now to FIGS. 4A–4C, diagrams illustrating the installation of an application on a client computer is depicted in accordance with a preferred embodiment of the present invention. In FIG. 4A, server 400 is in communication with client 402 via communications link 404. Client 402 includes image 406, which is a complete collection of the user operating environment, including for example, system memory, disk images, register images, connection to remote devices, and network and processor states. A snapshot or copy of image 406 is made from client 402 to form a snapshot image, which is stored on server 400. Server 400 may store a number of snapshot images 408, 410, and 412 for installation of new applications in the depicted example. A snapshot image of client 402 is a copy of the user's operating environment on client 402 as represented by image 406. This snapshot image may be of the entire operating environment or may be only that of the persistent storage depending on the implementation. This snapshot image is made when an application is to be installed on a client, such as client 402. The snapshot image may be created by the client sending incremental portions of the operating environment to the server until a complete image is stored on the server. In the depicted example, snapshot image 410 is a copy of image 406 on client 402.

Each user has an account on server 400 stored in user file 414. In the depicted example, this file includes a user ID, a machine type for the user client, and an identification of the location and/or space allocated for the snapshot image. This user file is used to track snapshot images for clients that are receiving new applications. When a snapshot image is updated, the information in user file 414 will be used to return the snapshot image to the appropriate client.

In the depicted example, one of the snapshot images on server 400 is copied onto client 416 to form snapshot image 418. This snapshot image is used to install one or more new applications for a client. When the application has been installed, an updated snapshot image 420 is present in client 416 as shown in FIG. 4B. In the depicted example, section 422 in image 420 contains the new application. Then, snapshot image 420 is returned to server 400 as illustrated in FIG. 4C. In this example, snapshot image 420 replaces snapshot image 410, which is the snapshot image associated with client 402. The updated image as reflected by snapshot image 420 is then returned to client 402 using the information in user 414 to return this updated snapshot image. This snapshot image is then used on client 402 in place of the original image, image 406. The user at client 402 now may have use of a new application that was installed without requiring an installer or technician to physically travel to client 402 to perform the install. In this example, the installation of a new application is performed on a client, such as client 416, that is close by or local to the installer. The client selected for the installation is usually of the same machine type and having the same configuration as the client from which the snapshot image was taken. Alternatively, the installation of the new application may actually take place on server 400. In such a case, server 400 includes an emulation of the client on which the application is to be installed.

Figure 5:
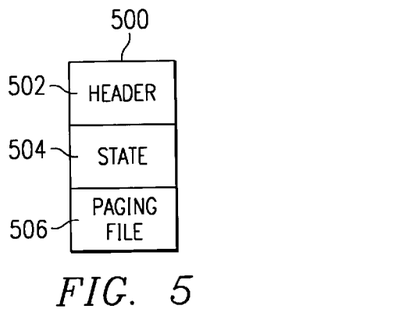
FIG. 5 is a diagram of an image depicted in accordance with a preferred embodiment of the present invention.

With reference to FIG. 5, a diagram of an image is depicted in accordance with a preferred embodiment of the present invention. Image 500 is an example of an image on a client, such as image 406 on client 402 in FIG. 4. Image 500 may be stored as a snapshot image on a server such as server 400 in FIG. 4. Image 500 is an image used to place a computer, such as client 402, into a selected state. Image 500 in this example includes header information 502, state information 504, and paging file information 506. Header information 502 describes the file layout and loading information for the image on the client, while state information 504 contains the state of the physical memory and hardware devices within the client (i.e. devices used by the operating system, interrupts, and network based real time clock). State information 504 may be obtained using known hibernation techniques, such as those described in U.S. Pat. No. 5,822,582.

Image 500 will include paging file information 506 only for systems involving virtual memory management. Paging file information within image 500 may be the paging file itself. Alternatively, a part of the paging file may be frozen or locked from changes in which the locked portion of the paging file contains information needed to restore, boot, or unhibernate the client. Although the depicted example employs a paging file, a paging space may be used in place of a paging file depending on the type of operating system. A paging space or paging file is applicable to systems with virtual memory managers.

Alternatively, snapshot image 500 may omit state information 504 and contain only paging file information 506, which is in essence the information located on persistent storage, such as a hard disk drive.

Figures 6, 7:
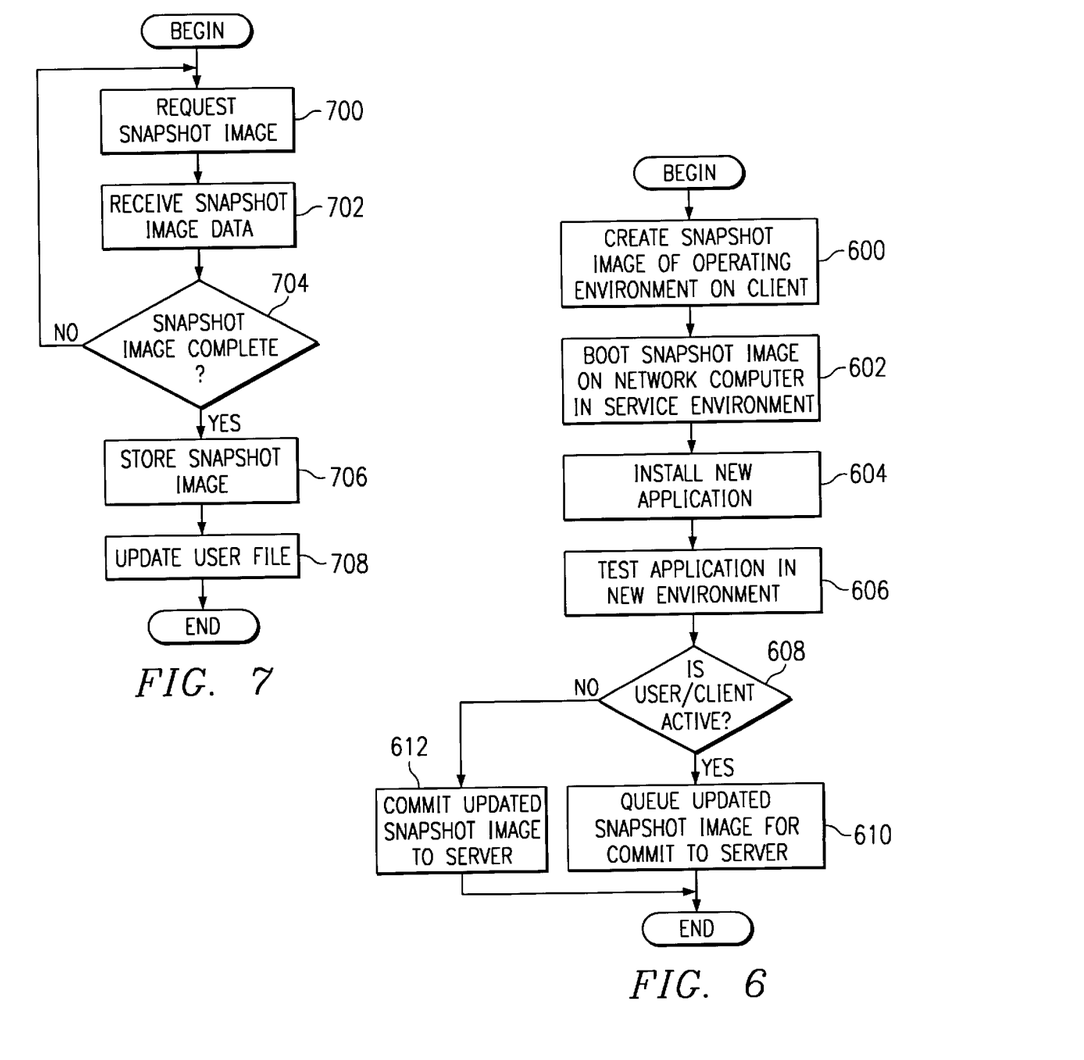
FIG. 6 is a flowchart of a process for installing an application depicted in accordance with a preferred embodiment of the present invention.
FIG. 7 is a flowchart of a process for creating a snapshot of an image depicted in accordance with a preferred embodiment of the present invention.

With reference now to FIG. 6, a flowchart of a process for installing an application is depicted in accordance with a preferred embodiment of the present invention. The process begins by creating a snapshot image of the operating environment on the client (step 600). This step is accomplished by having the client send a copy of the paging file and possibly state information to the server. This snapshot image is booted or started on a network computer in a service environment (step 602). This network computer is selected to have a configuration that is identical to that of the client from which the image was taken. The new application is installed (step 604), and the application is tested in the new environment (step 606). Next, a determination is made as to whether the client is active (step 608). This step is used to determine whether the client that is to receive the updated snapshot image is turned on so that the snapshot image can be sent to the client.

If the client is active, the updated snapshot image is then queued for commit to the server (step 610) with the process terminating thereafter. With reference again to step 608, if the client is not active, then the updated image is committed to the server for deliver to the client (step 612). This step causes delivery of the image to be scheduled for when the client becomes active.

With reference now to FIG. 7, a flowchart of a process for creating a snapshot of an image is depicted in accordance with a preferred embodiment of the present invention. The process in FIG. 7 may be implemented in a server to obtain a snapshot image of the client for use in installing one or more new applications.

The process begins by requesting a snapshot image from the client (step 700). Thereafter, the process waits to receive the snapshot image data from the client (step 702). When snapshot image data is received, a determination is made as to whether the snapshot image is complete (step 704). If the snapshot image is complete, this image is stored (step 706) and an entry is made in the user file to reflect the presence of the snapshot image (step 708) with the process terminating thereafter.

With reference again to step 704, if the snapshot image is not complete, the process returns to step 700 to receive snapshot image data.

Figure 8:
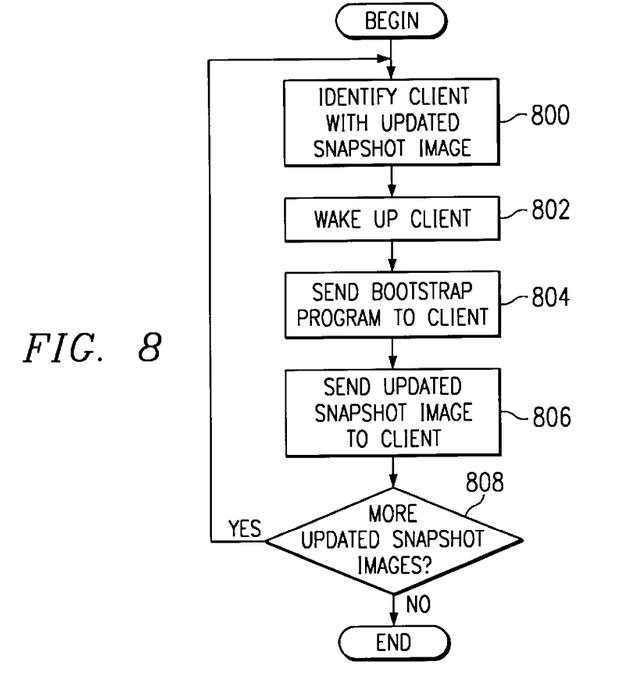
FIG. 8 is a flowchart of a process for sending a snapshot image to a client depicted in accordance with a preferred embodiment of the present invention.

Turning next to FIG. 8, a flowchart of a process for sending a snapshot image to a client is depicted in accordance with a preferred embodiment of the present invention. This process may be used by a server to return an updated snapshot image with the new application to the client. In returning a snapshot image to a client, the depicted example employs a mechanism, such as remote initial program load (RIPL), which is typically used to load an operating system from a server to a client. This process as well as other mechanisms may be used to send the updated snapshot image to the client.

The process begins by identifying a client with an updated snapshot image (step 800). The process then wakes up the client if the client is not active or is in a suspend mode (step 802). If needed, a bootstrap program is sent to the client (step 804). The sending of the bootstrap image is part of the mechanism, such as that used by RIPL. The process then sends the updated snapshot image to the client (step 806). A determination is then made as to whether additional updated snapshot images are present to be sent back to clients (step 808). If additional updated images are present, the process returns to step 800. Otherwise, the process terminates.

Figure 9:
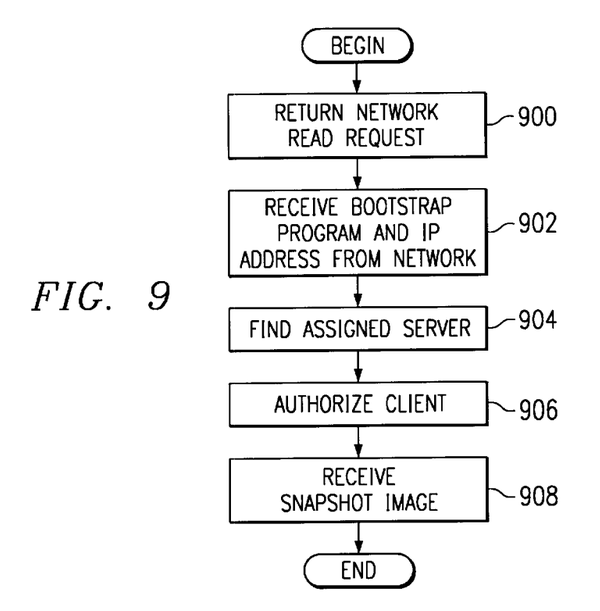
FIG. 9 is a flowchart of a process used by a client to receive a snapshot image depicted in accordance with a preferred embodiment of the present invention.

Turning next to FIG. 9, a flowchart of a process used by a client to receive a snapshot image is depicted in accordance with a preferred embodiment of the present invention. The process begins by the client returning a network read request, which is sent on to the network (step 900). Thereafter, the client receives a bootstrap program and an IP address from the network (step 902). The client then finds the server to which the client is assigned (step 904). The assignment of the server may be obtained from information stored locally at the client in a device, such as a flash RAM. Thereafter, the client is authorized for access to the server (step 906). The snapshot image is then received (step 908) with the process terminating thereafter. In the depicted examples in FIGS. 8 and 9, the same server is used to place the client onto the network as well as to return the snapshot image to the client. Depending on the implementation, one server or computer may be used to wake up or place the client on the network, such as a RIPL server with another server being used to return the snapshot image.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for installing an application on a client computer, the method comprising the computer implemented steps of:
   creating an image of each individual client computer;
   placing the image of one of the selected first client computer on a second computer;
   installing the application on the second computer, wherein the image of the first client computer is updated to include the application; and
   sending the updated image back to the first client computer.

2. The method of claim 1 further comprising:
   testing the application prior to sending the updated image back to the client computer.

3. The method of claim 1, wherein the step of sending the updated image back to the client computer includes using a remote method to rest the computer and load the updated image onto the client computers.

4. The method of claim 1, wherein the another computer is a client computer matching the selected client computer.

5. The method of claim 1, wherein the another computer is a server computer running an emulation of the selected client computer.

6. The method of claim 1, wherein the client computer includes a disk and wherein the image is an image of the disk.

7. The method of claim 1, wherein the client computer includes a disk and volatile memory wherein the image is an image of content of the disk and the volatile memory.

8. A method in a data processing system for installing an application, the method comprising the data processing system implemented steps of:
   creating images of operating environments for a first plurality of client computers;
   placing the images of the first plurality of client computers on a second computer;
   installing the application on the second computer using each of the images of the client computers to form a set of updated images that include the application; and
   returning the set of updated images to the first plurality of client computers.

9. The method of claim 8, wherein the another computer is another client computer.

10. The method of claim 8 further comprising:
    testing the application after installation prior to returning the set of updated images.

11. The method of claim 8, wherein the step of returning the set of updated images includes placing the updated images on a server for distribution to the plurality of client computers.

12. A distributed data processing system comprising:
    a network
    a plurality of client computers connected to the network; and
    a server computer connected to the network, wherein the server computer receives a snapshot image of a client computer within the plurality of client computers, allows for installation of a new application using the snapshot image, creates an updated snapshot image including the new application, and returns the updated snapshot image to the client computer, wherein the client computer is a first client computer and wherein the server loads the snapshot image onto a second client computer for installation of the new application.

13. A data processing system for installing an application on a client computer, the data processing system comprising:
    creating means for creating an image of each individual client computer;
    placing means for placing the image of one of the selected first client computer on a second computer;
    installing means for installing the application on the second computer, wherein the image of the first client computer is updated to include the application; and
    sending means for sending the updated image back to the first client computer.

14. The data processing system of claim 13 further comprising:
    testing means for testing the application prior to sending the updated image back to the client computer.

15. The data processing system of claim 14, wherein the step of sending the updated image back to the client computer includes using a remote method to rest the computer and load the updated image onto the client computer.

16. The data processing system of claim 14, wherein the another computer is a client computer matching the selected client computer.

17. The data processing system of claim 14, wherein the another computer is a server computer running an emulation of the selected client computer.

18. The data processing system of claim 14, wherein the client computer includes a disk and wherein the image is an image of the disk.

19. The data processing system of claim 14, wherein the client computer includes a disk and volatile memory wherein the image is an image of content of the disk and the volatile memory.

20. A data processing system for installing an application, the data processing system comprising:
    creating means for creating images of operating environments for a first plurality of client computers;
    placing means for placing the images of the first plurality of client computers on a second computer;
    installing means for installing the application on the second computer using cach of the images of the client computers to form a set of updated images that include the application; and returning means for returning the set of updated images to the first plurality of client computers.

21. The data processing system of claim 20, wherein the another computer is another client computer.

22. The data processing system of claim 21 further comprising:

testing means for testing the application after installation prior to returning the set of updated images.

23. The data processing system of claim 21, wherein the step of returning the set of updated images includes placing the updated images on a server for distribution to the plurality of client computers.

24. A computer program product in a computer readable medium for installing an application on a client computer, the computer program product comprising:

first instructions for creating an image of each individual client computer;

second instructions for placing the image of one of the selected first client computer on a second computer;

third instructions for installing the application on the second computer, wherein the image of the first client computer is updated to include the application; and fourth instructions for sending the updated image back to the first client computer.

25. A computer program product in a computer readable medium for installing an application, the computer program product comprising:

first instructions for creating images of operating environments for a first plurality of client computers;

second instructions for placing the images of the first plurality of client computers on a second computer;

third instructions for installing the application on the second computer using cach of the images of the client computers to form a set of updated images that include the application; and fourth instructions for returning the sot of updated images to the first plurality of client computers.

* * * * *

UNITED STATES PATENT AND TRADEMARK OFFICE
CERTIFICATE OF CORRECTION

PATENT NO. : 6,487,718 B1
DATED : November 26, 2002
INVENTOR(S) : Rodriguez et al.

It is certified that error appears in the above-identified patent and that said Letters Patent is hereby corrected as shown below:

Column 9,
Line 41, after "client", delete "computers" and insert -- computer --.

Column 10,
Line 61, after "using", delete "cach" and insert -- each --.

Column 11,
Line 5, after "claim", delete "21" and insert -- 20 --.
Line 9, after "claim", delete "21" and insert -- 20 --.

Column 12,
Line 14, after "using", delete "cach" and insert -- each --.
Line 17, after "the" delete "sot" and insert -- set --.

Signed and Sealed this

Twenty-ninth Day of July, 2003

JAMES E. ROGAN
*Director of the United States Patent and Trademark Office*